United States Patent [19]
Frei et al.

[11] Patent Number: 4,965,101
[45] Date of Patent: Oct. 23, 1990

[54] CERAMIC FOAM FOR FILTERS FOR CLEANING EXHAUST GASES OF DIESEL ENGINES

[75] Inventors: Olaf Frei, Siblingen; Max Frish, Beringen; Viktor Bodmer; Tiberiu Mizrah, both of Schaffhausen, all of Switzerland

[73] Assignee: Swiss Aluminium Ltd., Chippis, Switzerland

[21] Appl. No.: 280,689

[22] Filed: Dec. 6, 1988

[30] Foreign Application Priority Data

Dec. 10, 1987 [CH] Switzerland .......................... 4825/87

[51] Int. Cl.$^5$ ............................................ C23C 16/00
[52] U.S. Cl. ................................. 427/255; 427/372.2; 427/443.2
[58] Field of Search ............... 427/255, 244, 180, 226, 427/372.2, 443.2; 428/148, 312.2

[56] References Cited

U.S. PATENT DOCUMENTS 4,692,356 9/1957 Asaeda et al. ...................... 427/244
4,738,874 4/1988 Benardo et al. ...................... 427/244

FOREIGN PATENT DOCUMENTS 0193701 9/1986 European Pat. Off. .
1021662 3/1966 United Kingdom .
2097777A 11/1982 United Kingdom .

Primary Examiner—Stanley Silverman
Attorney, Agent, or Firm—Bachman & LaPointe

[57] ABSTRACT

In certain operating conditions of diesel engines, diesel soot filters which are made of known ceramic foam and filter efficiently per se have zero or only a very low degree of particle filtration, in particular at hight exhaust temperatures and exhaust velocities, that is, above all when the diesel engines are running under full load. Ceramic foam filters for cleaning exhaust gases of diesel engines in which the surface is roughened and wherein the peak-to-peak interval is approximately 1 to 100 μm, preferably 1 to 10 μm, do not have this disadvantage. A ceramic foam of this kind is manufactured by roughening the surface by deposition of inorganic materials and, if required, subsequent decomposition by temperature treatment.

11 Claims, 2 Drawing Sheets

CERAMIC FOAM FOR FILTERS FOR CLEANING EXHAUST GASES OF DIESEL ENGINES

BACKGROUND OF THE INVENTION

The invention relates to ceramic foam for filters for cleaning exhaust gases of diesel engines.

In certain operating conditions of diesel engines, it has turned out that ceramic foam diesel soot filters which filter efficiently per se, have a zero or only very low degree of particle filtration. This happens particularly at high exhaust temperatures and exhaust velocities, that is, above all when the diesel engines are running under full load. The inadequate degree of particle filtration is traced back to excessively low adhesion of soot particles to the ceramic foam. An inadequate coefficient of adhesion limits the probability of soot retention within the ceramic foam, and therefore soot agglomerates can no longer form. But the latter are necessary for obtaining the deep-action efficiency of filters of this kind.

In view of the circumstances, the inventors set themselves the aim of increasing the filter action in a diesel soot filter with ceramic foam by increasing the adhesion of soot particles, in such a way that the filter has a high degree of filtration in all operating conditions of the diesel engine, particularly also in the range in which so-called dry soot accumulates, that is, soot which is free from adsorbed hydrocarbons.

It is therefore the object to prepare a ceramic foam filter which attains the aim, and specify a method for the manufacture of a ceramic foam filter of this kind.

Hydrocarbons usually promote the adhesion of soot inside the porous ceramic foam structure. Thus, when hydrocarbons are absent from the exhaust gases or their content is below average, the rate of filtration of soot particles is reduced as well, if ordinary ceramic foam is used.

SUMMARY OF THE INVENTION

According to the invention, the set object is achieved by a ceramic foam filter for cleaning exhaust gases of diesel engines which is characterized by a roughened surface wherein the peak-to-peak interval is approximately 1 to 100 ,$\mu$m, preferably 1 to 10 $\mu$m. Advantageous developments of the ceramic foam filter according to the invention are further characterized by a peak height of not more than 100 $\mu$m, preferably not more than 50 $\mu$m and a porosity in the range of 30 to 80 pores per linear inch.

The partial object relating to manufacture of the ceramic foam filter according to the invention is achieved by a method in which the surface is roughened by deposition of inorganic materials and if required subsequent decomposition by temperature treatment. Deposition is preferably carried out by a precipitation method from a supersaturated solution that deposits a hydroxide or salt. The method is further characterized in that the supersaturated solution is a caustic soda solution supersaturated with aluminum so that the deposited material is aluminum hydroxide which can be subsequently converted to aluminum oxide by temperature treatment.

The foregoing objects are achieved by ceramic foam filter bodies which have been treated so as to have external surfaces with a relatively high surface roughness capable of effectively and efficiently trapping soot particles within diesel exhaust under the full range of engine operating conditions.

DETAILED DESCRIPTION OF THE INVENTION

Figure 1:
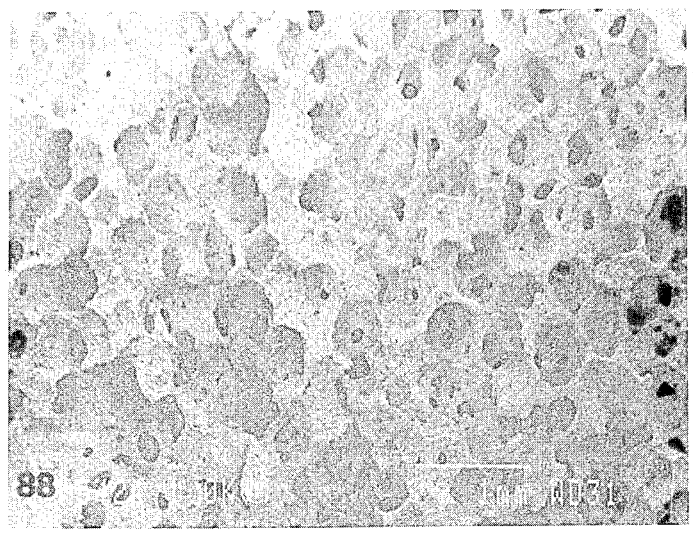
FIGS. 1 and 2 illustrate a roughened filter surface on a ceramic foam filter formed as outlined in Example 1.

The underlying ceramic foam filter body may be formed from any conventional ceramic foam material known in the art using any suitable technique known in the art. For example, the filter body may be formed using the technique described in U.S. Pat. No. 4,024,212. Preferably the filter body has a porosity in the range of 30 to 80 pores per linear inch. Cordierite is a preferred filter material although other ceramic compositions such as low expansion materials, e.g. aluminum titanate may be employed.

The surface(s) of the filter body are roughened by the deposition of a layer of inorganic materials and, if necessary, by subsequent decomposition using a temperature treatment. In roughening the surface(s), it is desirable that the layer deposited on each surface have a thickness in the range of from about 10 microns to about 200 microns and be formed from particles having a peak height of no more than 100 $\mu$m and preferably no more than 50 $\mu$m so as to prevent an increase in the back pressure of the filter system. It is also desirable that the peak-to-peak interval between particles be approximately 1 to 100 $\mu$m, preferably approximately 1 to 10 $\mu$m, so as to insure capture of the usually submicron diesel soot particles. A typical deposited layer formed in accordance with the present invention will add to the underlying filter body a weight/unit volume in the range of from about 50 mg/cm$^3$ to about 200 mg/cm$^3$ preferably from about 50 mg/cm$^3$ to about 120 mg/cm$^3$.

While any suitable deposition technique may be employed to roughen the surface(s) and form the deposited layer(s), a particularly useful technique for forming the desired roughened surface(s) is deposition from supersaturated solutions, for example deposition from a 60° C. warm caustic soda solution containing from about 100 g Na$_2$O/liter solution to about 170 g Na$_2$O/liter solution, preferably at around 120-130 g Na$_2$O/liter solution as NaOH containing from about 110 g Al$_2$O$_3$/liter solution to about 230 g Al$_2$O$_3$/liter solution in the form of an aluminum compound such as Al(OH)$_3$ preferably in a molar ratio in the range of from 1.20 to 1.45 moles NA$_2$O to moles Al$_2$O$_3$.

Mineral acids as solvents such as hydrochloric acid have also been found to be useful for the deposition of aluminum salts. Generally, the choice of solvent depends on the chemical properties of the material to be deposited. The solvent should advantageously have a slight etching effect on the ceramic foam to be coated in order to expose discrete growth zones or form centers of crystallization in a previous etching process or one which is simultaneous with deposition so that the thickness of the deposited material becomes irregular and leads to the rough surface of the ceramic foam according to the invention.

When the deposited material is aluminum hydroxide, the temperature treatment may be used to convert it to an aluminum oxide such as an almost anhydrous activated alumina or corundum. The deposited material may be rinsed with water and converted or decomposed by calcining at a temperature from about 600° C. to about 1000°, preferably from about 700° C. to about 800° C., for a time in the range of from about 1 hour to about 5 hours.

As an other possible technique to roughen the surface, it is possible to use a chemical vapor deposition (CVD) method in which $Si_3N_4$, SiC, TiC, titanium hydroxycarbide, $ZrO_2$ and in particular $Al_2O_3$ and TiN are suitable for use as materials to be deposited. When using a CVD technique, care must be taken to use a gas velocity high enough to transport the substance to be deposited right into the interior of the ceramic foam to be coated.

The rate of build-up of the deposited substance must be monitored in such a way that a coating which is as homogeneous as possible regardless of location is formed within the ceramic foam structure. In particular, a build-up over the outer pores at the surface(s) of the ceramic foam to be coated must be prevented, as otherwise penetration of the reaction gases into the interior of the ceramic structure would be prevented.

EXAMPLE 1

A cylindrical ceramic foam body made from cordierite, with a 50 ppi pore size, a diameter of 142 mm and a height of 51 mm, was moved for 12 hours in a NaOH solution supersaturated with A12(0)3 The molar ratio of Na20 (caustic) to A1203 was 1.35. The temperature was kept at 60° C.

Figure 2:
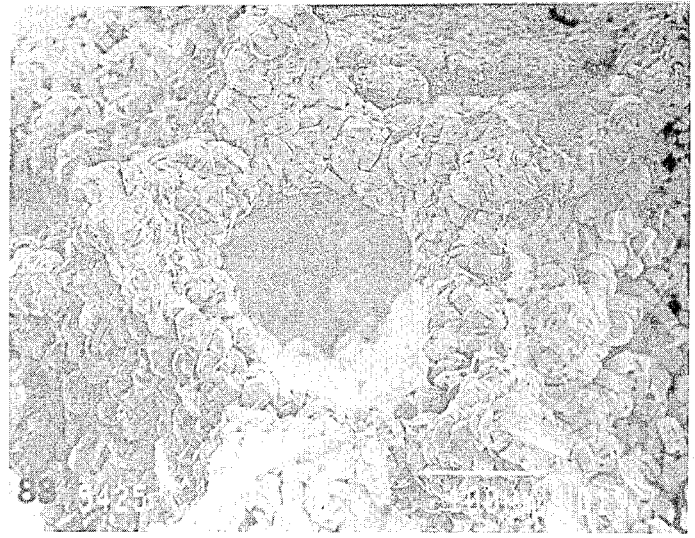

Thereafter the ceramic body was rinsed with water and calcined at 700° C. for 3 hours. The result is shown by FIGS. 1 and 2 with magnification. The surface layer had a thickness of approximately 100 microns and consisted of an almost anhydrous activated alumina. The particles forming the layer had a peak height of about 30 microns and a peak-to-peak interval of approximately 30 microns. The layer had a weight/unit volume of 120 mg/cm$^3$.

EXAMPLE 2

Figure 3:
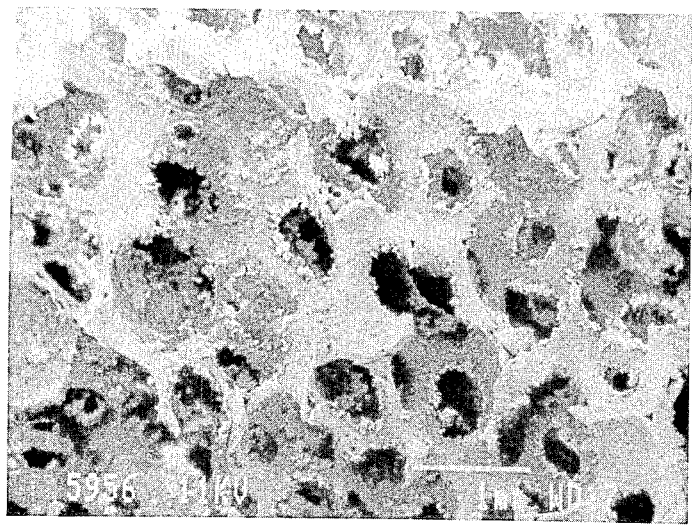
FIG. 3 illustrates a roughened filter surface on a ceramic foam filter formed as outlined in Example 2.

A ceramic foam filter was produced as in Example 1 using a calcining temperature of 700° C. for 3 hours. The resultant filter surface is shown in FIG. 3. The filter was canned and installed in the exhaust pipe of a 2.4 liter diesel engine. This engine was run under full load steady state conditions and 1200, 2200 and 4000 rpm. These three revolution speeds produced different exhaust temperatures —400°, 500° and 700° C. Under each condition, Bosch number was measured. High Bosch number means an exhaust gas heavily loaded with soot particles, a low Bosch number is obtained by clean exhausts. For comparison purposes, the test was repeated using no filter at all and also using a filter body formed from the same ceramic foam part made of cordierite but without any complementary roughening treatment.

Figure 4:
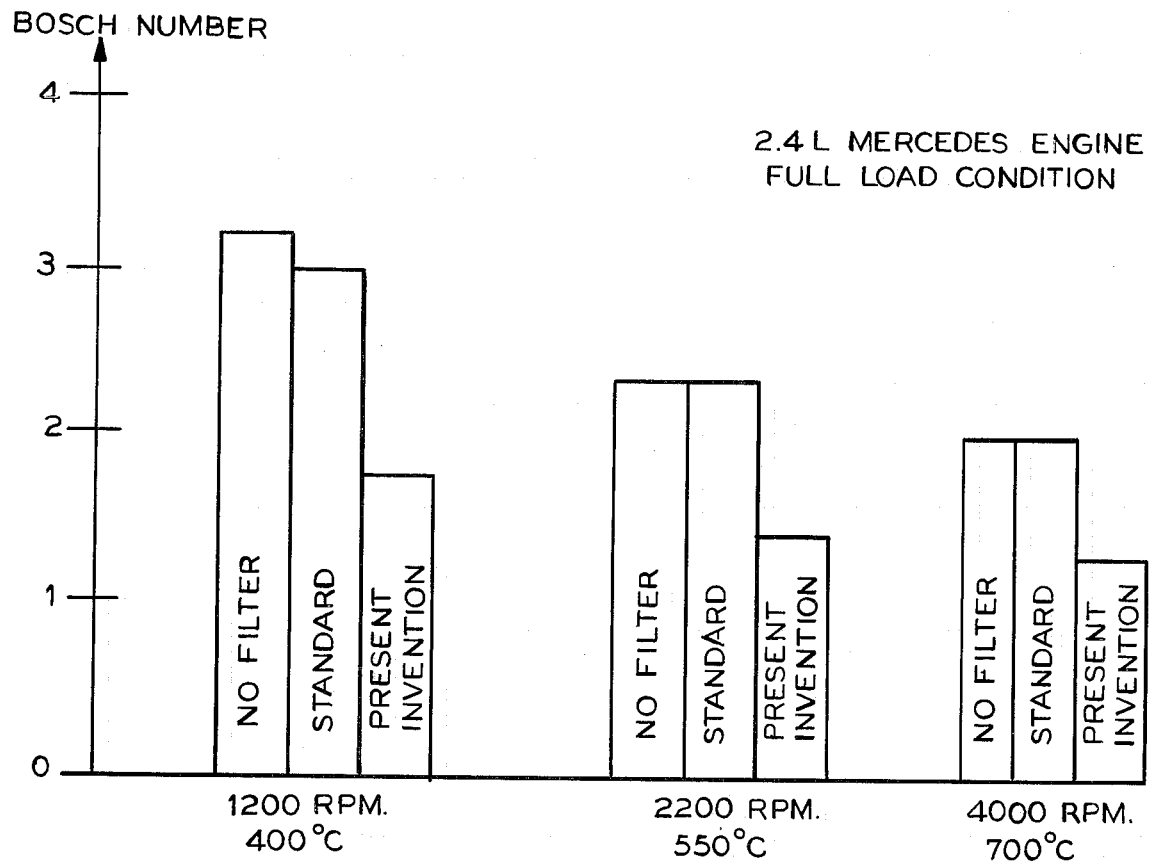
FIG. 4 is a graph illustrating the performance of different ceramic foam filters under various diesel engine operating conditions.

As can be seen from FIG. 4, the filter of the present invention had a lower Bosch number for each test condition indicating much better exhaust gas cleaning.

It is apparent that there has been provided in accordance with this invention a ceramic foam filter for cleaning exhaust gases of diesel engines and a method for forming such a filter which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Method for the manufacture of a ceramic foam for filters for cleaning exhaust gases of diesel engines which comprises:

providing a ceramic foam filter body having a plurality of pores;

roughening at least one surface of said body without blocking said pores so as to improve a filter action and enhance the capture of diesel soot particles; and said roughening step including depositing particles formed from an inorganic material on said at least one surface and thereby forming a roughening layer having a thickness in the range of from about 10 μm to about 200 μm and a particle peak-to-peak interval of approximately 1 μm to about 100 μm so as to insure said capture of said diesel soot particles.

2. Method according to claim 1 further comprising applying a temperature treatment to decompose said deposited particles.

3. Method according to claim 1 wherein said roughening step comprises a CVD deposition of said inorganic materials.

4. Method according to claim 1 characterized in that said roughening step comprises depositing said particles from a supersaturated solution.

5. Method according to claim 4 characterized in that said roughening step further comprises depositing a hydroxide or a salt.

6. Method according to claim 4 characterized in that said depositing step comprises depositing aluminum hydroxide particles from a caustic soda solution supersaturated with aluminum.

7. Method according to claim 6 wherein said caustic soda solution contains from 100 g Na$_2$O/liter solution to about 170 g Na$_2$O/liter as NaOH and from about 100 g Al$_2$O$_3$/liter solution to about 230 g Al$_2$O$_3$/liter in the form of Al(OH)$_3$ in a molar ratio in the range of from 1.20 to 1.45 moles Na$_2$O to moles Al$_2$O$_3$.

8. Method according to claim 6 further characterized by converting said aluminum hydroxide to aluminum oxide by calcining at a temperature from about 600° C. to about 1000° C. for a time in the range of from about 1 hour to about 5 hours.

9. Method according to claim 8 wherein said calcining step is performed at a temperature in the range of from about 700° C. to about 800° C.

10. Method according to claim 4 further comprising etching said ceramic foam prior to said depositing step.

11. The method of claim 1 wherein said roughening step comprises roughening an exterior surface of said filter body.

* * * * *